United States Patent [19]
Kikuchi

[11] Patent Number: 5,706,363
[45] Date of Patent: Jan. 6, 1998

[54] AUTOMATED RECOGNITION SYSTEM FOR PRINTED MUSIC

[75] Inventor: Takeshi Kikuchi, Hamamatsu, Japan

[73] Assignee: Yamaha Corporation, Hamamatsu, Japan

[21] Appl. No.: 419,509

[22] Filed: Apr. 7, 1995

Related U.S. Application Data

[63] Continuation of Ser. No. 922,567, Jul. 30, 1992, abandoned.

[30] Foreign Application Priority Data

Jul. 31, 1991 [JP] Japan .................. 3-216013

[51] Int. Cl.$^6$ .................................................... G06K 9/00
[52] U.S. Cl. ...................... 382/113; 382/182; 382/203; 84/76
[58] Field of Search .............................. 382/100, 112, 382/113, 182, 203; 84/76

[56] References Cited

U.S. PATENT DOCUMENTS 5,042,079  8/1991  Morikawa et al. .................. 382/22

FOREIGN PATENT DOCUMENTS

| | | |
|---|---|---|
| 61-62983 | 3/1986 | Japan . |
| 0130496 | 12/1989 | Japan . |
| 59510 | 12/1990 | Japan . |
| 0457183 | 2/1992 | Japan . |

OTHER PUBLICATIONS

Hirokazu Kato and Seiji Inokuchi. *Treatises of Electrical Information Communication Society*, "Automatic Recognition of Printed Piano Music Based on Bar Unit Processing", May 1988, pp. 894–901.

W.J. Kim et al, "Recognition System for Printed Music Score" Aug. 1987 pp. 573–577.

Matsushima et al, "Automated Recognition System for Musical Score", 1985, pp. 25–52.

*Primary Examiner*—Leo Boudreau
*Assistant Examiner*—Chris Kelley
*Attorney, Agent, or Firm*—Loeb & Loeb LLP

[57] ABSTRACT

An automated recognition device for printed music which converts information of the printed music to two-dimensional image data and recognizes notes and signs from this data. Auto-correlation values along a vertical axis are obtained from pixels in a horizontal direction and a first peak is judged to be a line interval of staffs of the printed music. In a second aspect of the invention the number of hooks is determined on the basis of pixel number data existing in the horizontal direction in a region having a predetermined width on both sides of a note. In the third aspect of the invention, image data is removed from a start point by raster scan on the basis of consecutive data. In the fourth aspect of the invention, a shape of a sign in image data is projected on vertical and horizontal axes and the shape of the sign is assumed to exist in rectangular coordinates. The same processing is repeated and the shape of the sign is judged to exist in rectangular coordinates which can not be divided any further.

8 Claims, 15 Drawing Sheets

AUTOMATED RECOGNITION SYSTEM FOR PRINTED MUSIC

This is a continuation of application Ser. No. 07/922,567 filed Jul. 30, 1992, now abandoned.

BACKGROUND OF THE INVENTION

This invention relates to an automated printed music recognition system which converts printed music (a score) to two-dimensional image data and recognizes notes and signs from this image data.

There have been attempts to convert printed music which have no variation as in characters to image data by means of an image scanner and a computer system and recognize printed music information on the basis of this image data for the purpose of, e.g., automatically preparing a MIDI (Musical Instrument Digital Interface) code.

For achieving this, data of staffs and bar lines which become an obstruction in obtaining information concerning notes and signs in the image data are removed and then remaining information, i.e., notes and signs, is recognized for the preparation of the MIDI code. Notes and signs which have been recognized are also removed successively so that they will not obstruct recognition of notes and signs to be recognized thereafter.

A specific flow of this processing is as follows:

(1) Loading of printed music data; converting printed music to image data and storing the data.

(2) Detection of staffs; detecting staff data in the image data.

(3) Removal of staffs; deleting the detected staff data from the image data.

(4) Detection of bar lines; detecting bar line data in the image data.

(5) Removal of bar lines; deleting the detected bar line data.

(6) Detection of notes; detecting respective note data in the image data.

(7) Recognition of notes; recognizing the respective detected note data.

(8) Removal of notes; deleting the recognized and processed note data.

(9) Detection of signs; detecting respective signs in the image data.

(10) Recognition of signs; recognizing the respective detected signs.

(11) Removal of signs; deleting the recognized signs.

Since the MIDI code can be prepared by the processing up to the step (10) (recognition of signs), the step (11) (removal of signs) need not necessarily be executed. For convenience of processing, however, signs may also be removed.

An example of a conventional method of detecting staffs (step (2)) which is described by an article will be briefly described as follows:

A staff of printed music provides position information of notes (i.e., note intervals) and also an index to a region where a sign exists. Signs do not exist all over the printed music but exist to a limited extent within and in the vicinity of staffs except for words and a title of the music. By utilizing this fact, the range of search for signs can be narrowed and the time required for recognition can thereby be shortened. Staffs appear to be easy to detect as compared with other signs but actually there exists overlapping with other signs, cutting, inclination and bending in staffs and, moreover, staffs cause a noise to be generated in detecting a sign. For these reasons, staffs are in most cases removed prior to recognition of notes and signs. Ledger lines, e.g., three lines above and five lines below is expected.

In a two-dimensional printed music image loaded in a memory of a computer, horizontality of staffs to entire image data is not ensured but staffs are considered to have a certain inclination. Each line interval of staffs and the number of stages of staffs for a sheet of a score are not determined either.

For detecting such staffs, the printed music image is scanned at ten positions at an equal interval in the vertical direction to measure run lengths of black pixels and white pixels. "Horizontal" and "vertical" in this specification correspond to vertical and horizontal directions of each page of printed music. Histograms of the run lengths of the black pixels and the white pixels are obtained and run lengths which are of a maximum value in these histograms are respectively considered to be the width of each line and line interval.

Then, the image is vertically scanned again at ten positions and a candidate for each of five lines is selected at each scanning on the basis of values of the line width and line interval thus obtained. Candidates of staffs selected by all scanning are collected and a window of a certain size is applied to positions of occurrence at high frequency. The window is moved horizontally to determine accurate start and end positions of staffs by utilizing projection in the horizontal direction.

As shown in FIG. 21, a note generally consists of a head 1 and a stem 2 which is added when necessary and additionally has a hook 3, when necessary. As to the step of note recognition (step (7) above), an example of a prior art method of recognizing position and number of hooks in a case where the head 1 and the stem 2 of a sign have already been recognized is disclosed in Japanese Patent Publication No. Hei 2-59510. This prior art method will now be described.

For searching a hook of a note, a window is establised in the vicinity of a stem and a histogram in the direction of a vertical axis is obtained. When continuity of histogram exists over more than ½ of the respective line interval of staffs and below the respective line interval, a hook is judged to exist. In this case, the judgement of presence or absence of a hook is made solely on the basis of presence or absence of pixels. Processing concerning a hook differs between a single, independent note and grouped notes.

In the case of grouped notes as shown in FIG. 22, the distance between adjacent peaks is detected in hitograms in the direction of a horizontal axis with respect to stems F1 and F2 to be recognized. When the distance between the peaks is larger than the width of the head, a window is established at a position spaced from the head by the width of the head. In FIG. 22, windows W1, W1' and W2 correspond to this window. When the distance between the peaks is smaller than the width of the head, a window is established adjacent to the stem as a window W2' beside the stem F2 in FIG. 22. After establishing the windows W1, W1', W2 and W2' for searching for a hook, histograms in the direction of a vertical axis are obtained within the respective windows and, when there is continuity of histogram over more than ½ of a line interval GP and below the line interval GP, a hook is judged to exist.

When the note to be recognized is a single, independent note as shown in FIG. 23, windows W5 and W6 which are shortened by an amount equal to the length of a hook are established on the right side of stems of notes. Since positions of stems can be recognized from the peak position in histograms in the horizontal direction and hooks are affixed to notes on the right side thereof, rectangular windows W5 and W6 are established on the right side of the stems at positions separated from the stems by a predetermined distance. By displacing these windows W5 and W6 rightwardly by a predetermined distance, hooks which overlap with the windows W5 and W6 can be detected. More specifically, single notes are obtained from histograms in the horizontal direction to detect the note pitches and, after removing their head portions, windows W5 and W6 are established on the right side of the stems spaced apart by ½ of the horizontal width of the head. Histograms in the direction of a vertical axis are obtained within the windows W5 and W6 and, when continuity of histogram is more than ½ of the line interval GP and below the line interval GP, counting of portions corresponding to the hooks is made for detecting the hooks.

Japanese Patent Publication No. Hei 2-59510 discloses also an example of a prior art method of removing notes (step (8) above). This prior art method will be described below.

Objects which have already been recognized are removed from printed music data. In this case, bar lines are removed by rectangular windows and staffs are removed one after another by moving a template. A single note is removed by a window enclosing all of the single note. Heads and stems of grouped notes are removed by a window which does not cover a hook and the hook is removed by a window which does not cover the heads and stems. In this manner, bar lines, staffs, single notes, heads and stems of grouped notes, and hooks of grouped notes are respectively detected and removed by respectively corresponding windows. Data remaining in the printed music comprises signs only.

Since, as described above, data processing in recognizing image data of printed music is made in the order of staffs, bar lines, notes and signs and signs are left finally, removal of signs is not always necessary. In case signs are to be removed, the same manner of removal that is applied to notes can be applied also to signs. Since notes are recognized prior to signs, notes are removed prior to signs.

Detection of a rectangular position of a sign as a manner of detection of a sign (step (9) above) will now be described.

Detection of a rectangular position of a sign means obtaining coordinate data of a rectangular region corresponding to a range defined by x-axis (horizontal) and y-axis (vertical) in which a shape of a sign exists. After detecting this rectangular position, i.e., sign position, recognition of the sign, i.e., identification of the type of the sign, is performed. In recognizing the sign, the recognizing processing is made within the rectangular coordinates. The rectangular position of the sign is therefore necessary in detecting the sign.

The rectangular position detection is used for detecting signs such as sharps (♯), flats (♭), rests, G clefs, and F clefs and, for detection of notes which is made prior to detection of signs, a detection method other than the rectangular position detection is used. For detecting notes, for example, a method is employed according to which a peak position obtained by x-axis projection is recognised to be a position of a stem and presence of a note therefore is recognized.

As described above, the conventional method for detecting staffs (step (2) above) by scanning several specific positions has the possibility that accurate frequency data cannot be obtained in a case where there is an unclear portion or like fault on a score. It is therefore difficult in the conventional method to detect accurately an interval between a certain line, e.g., the y coordinate of the uppermost line and each line of staffs.

According to the prior art method for recognizing a hook in note recognition (step (7) above), the manner of establishing a window for obtaining a histogram is complicated in that different processings are performed for recognizing a hook of a single note and for recognizing grouped notes. In a case where recognition of substantial music information shown in a printed music is sufficient such as recognition of a printed music for preparing the MIDI code, it will suffice if the number of hooks is known, i.e., whether the note is a quarter note or an eighth note etc., that is, the length of the tone represented by the note, is known and strict recognition of the shape of the hook is unncessary. In such case, it is not necessary to discriminate a hook of a single note from a hook of grouped notes as in Japanese Patent Publication No. Hei 2-59510 so that it will be desirable to accurately recognize the number of hooks by a simpler processing.

As regards removal of notes (step (8) above), the prior art method requires a great deal of processing and time for removing notes from image data. For realizing a high speed processing, it is desirable to remove notes from image data by a simpler processing.

As regards detection of signs (step (9) above), it is difficult in the prior art method to accurately detect position of signs. Particularly, when plural image data exist in close proximity to each other, i.e., plural image data of a sign exist separately in a rectangle, it is difficult to separate them accurately and detect sign positions individually. For ensuring recognition of a sign in the step (10) above, it is important to detect image data separately existing in a rectangle without omission.

It is, therefore, an object of the invention to provide an automated printed music recognition system capable of accurately recognizing printed music information with a simple structure which easily enables a high speed operation.

It is a specific object of the invention to provide an automated printed music recognition system capable of accurately detecting positions of staffs even in a case where unclear portions exist in the printed music.

It is another specific object of the invention to provide an automated printed music recognition system capable of recognizing the number of hooks necessary for detecting length of a tone represented by a note by performing a common processing for both a single note and grouped notes.

It is another specific object of the invention to provide an automated printed music recognition system capable of removing notes from image data by a simple processing which easily enables a high speed operation.

It is still another specific object of the invention to provide an automated printed music recognition system which, even in a case where plural sign data of a printed music exist in close proximity to each other, is capable of separating them accurately and detecting sign positions individually.

SUMMARY OF THE INVENTION

A first automated recognition device for printed music according to the invention comprises converting means for converting information of the printed music to two-dimensional image data, line interval detection means for obtaining, from the two-dimensional image data, auto-correlation values in a direction of a vertical axis of distribution data of a number of pixels existing in a direction of a horizontal axis and detecting a first peak value of the auto-correlation values as constituting a line interval of staffs of the printed matter, and line position detection means for detecting position of the staffs by adding, responsive to the line interval detected by the line interval detection means, data at five points which are spaced by a line interval between adjacent points in the direction of the vertical axis of the distribution data of the number of pixels obtained in the direction of the vertical axis and successively shifting the five points thereby detecting the positions of the five points at a time when maximum sum data is obtained, the staffs of the printed music being detected by defining the positions of the five points as the positions of the staffs.

In the first automated printed music recognition device, auto-correlation values in the direction of the vertical axis are obtained with respect to data of pixels existing in the direction of the horizontal axis and a first peak of the auto-correlation values is judged to be a line interval of staffs. When a maximum value is obtained in data obtained by adding data of five points which are respectively delayed by the line interval, positions of the five points are determined to be positions of staffs. Therefore, even in a case where some unclear portion exists in a score, positions of staffs can be accurately detected.

A second automated recognition device for printed music according to the invention comprises converting means for converting information of the printed music to two-dimensional image data, pixel distribution detection means for obtaining distribution data in a direction of a vertical axis of the number of pixels existing in the direction of a horizontal axis in a rectangular region having a predetermined width on both sides of a stem of a note, and hook number detection means for detecting the number of hook or hooks of the note on the basis of lengths in the direction of the vertical axis of the distribution data which consecutively exceed a predetermined value, recognition of the note being performed by employing the number of hooks.

In the second automated printed music recognition device, the number of hooks is determined on the basis of length which consecutively exceeds a predetermined value of pixel number data existing in the direction of a horizontal axis in a rectangular region having a predetermined width on both sides of the stem of a note and, therefore, the number of hooks necessary for judging length of a tone represented by the note can be readily recognized by performing a common processing for both a single note and grouped notes.

A third automated recognition device for printed music according to the invention comprises converting means for converting information of the printed music to two-dimensional image data, consecutive data detection means for obtaining, on the basis of a range of removal in data of a predetermined scanning axis in image data which has already been recognized and is to be removed, consecutive data in data existing in the next scanning axis which at least partially coincides in coordinates thereof with the range of removal in the data of the scanning axis, and image removing means responsive to the consecutive data obtained by the consecutive data detection means, for successively removing the image data to be removed, the image data to be removed being removed from a point of start of removal by raster scan.

In the third automated printed music recognition device, image data to be removed is successively removed from a point of start of removal by raster scan on the basis of consecutive data in data existing in the next scanning axis which at least partially coincides in coordinates thereof with the range of removal in the data of the present scanning axis whereby notes can be removed from the image data with a simple processing which enables a high speed operation.

A fourth automated recognition device for printed music according to the invention comprises converting means for converting the information of the printed music to two-dimensional image data, first rectangular coordinate detection means for detecting rectangular coordinates consisting of respective axes in which pixels consecutively exist by projecting a shape of a sign in image data on vertical and horizontal axes, and second rectangular coordinate detection means for detecting rectangular coordinates by performing projection on vertical and horizontal axes in the rectangular coordinates detected by the first rectangular coordinate detection means and repeating the same processing with respect to rectangular coordinates obtained, and final rectangular coordinate judging means for judging that rectangular coordinates cannot be divided by the second rectangular coordinate detection means, the shape of the sign to be detected being thereby judged to exist in the rectangular coordinates which cannot be divided any further.

In the fourth automated printed music recognition device, the shape of a sign in the image data is projected on vertical and horizontal axes and the shape of the sign is assumed to exist in rectangular coordinates consisting of respective axes in which pixels consecutively exist. The same processing is repeated with respect to rectangular coordinates detected and the shape of the sign to be detected is judged to exist in the rectangular coordinates which cannot be divided any further. Accordingly, even when plural sign data exist in close proximity with each other in the score, these data can be accurately separated and the position of the sign can be individually detected.

Embodiments of the invention will be described with reference to the accompanying drawings.

BRIEF DESCRIPTION OF THE DRAWINGS

In the accompanying drawings.

DESCRIPTION OF PREFERRED EMBODIMENTS

Figure 1:
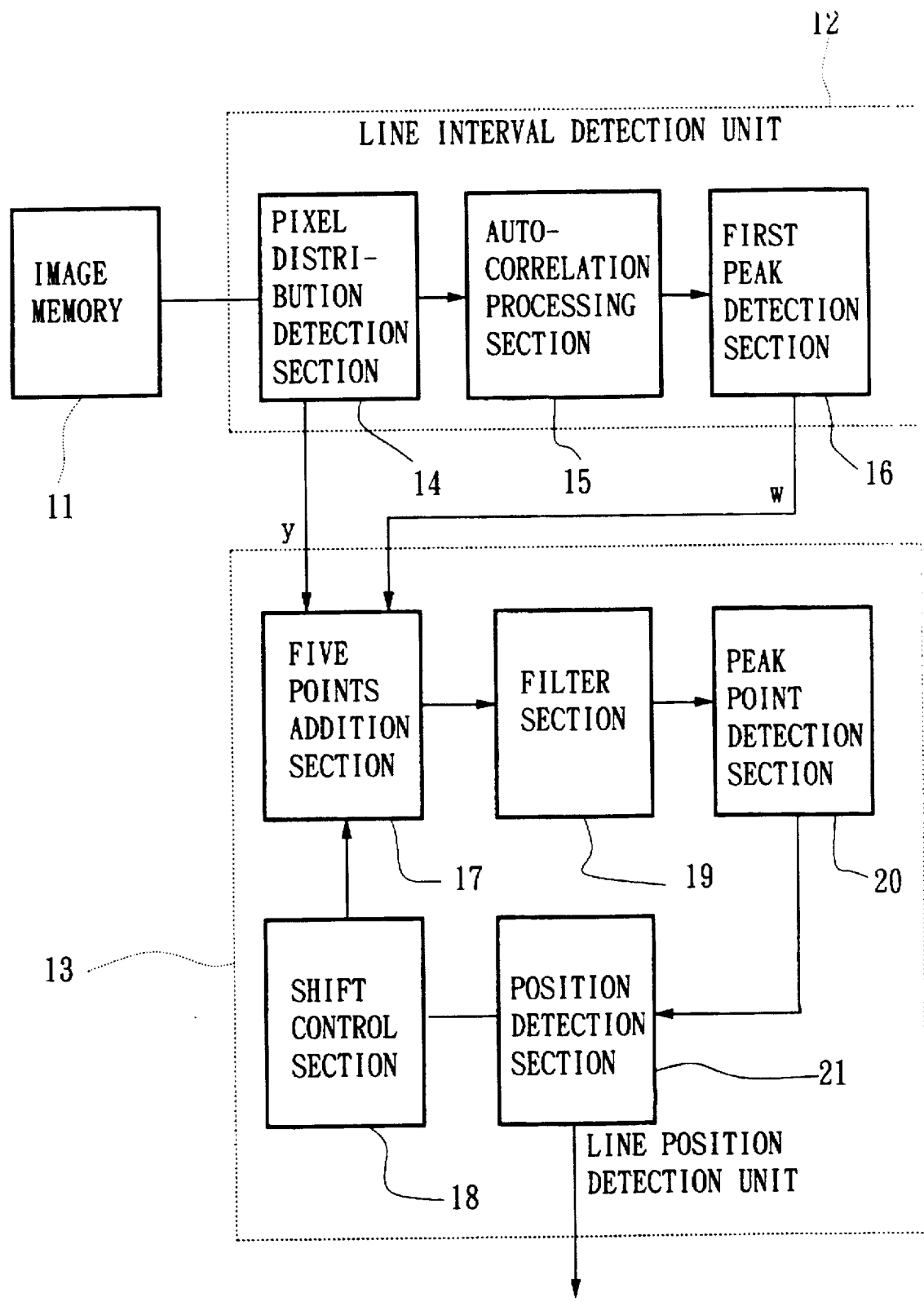
FIG. 1 is a block diagram schematically showing a structure of a main portion of an embodiment of the first automated recognition device for printed matter according to the invention.

FIG. 1 schematically shows a structure of a main portion of an embodiment of the first automated recognition device for printed music according to the invention. FIG. 1 shows a structure for detecting positions of five lines in a printed music image in the automated printed music recognition device. For removing staffs which become an obstruction in recognizing notes and signs by the automated recognition device, the y coordinate of the uppermost line of the staffs, i.e., the fifth line of staffs and line interval w are detected in this embodiment.

In this embodiment, staffs are detected by analyzing, by signal processing, one dimensional information obtained along the y axis with respect to distribution of the number of black pixels existing in the direction of x-axis of a printed music image. More specifically, by using the auto-correlation method as a signal processing method, a minimum period is obtained from the one-dimensional information obtained by projecting the black pixel number in the x-axis direction of the printed music image and this minimum period is used as the line interval of staffs. By detecting a position at which a total value of projected one-dimensional information corresponding to the interval of staffs becomes maximum, positions of staffs are assumed.

FIG. 1 shows an image memory 11, a line interval detection unit 12 and a line position detection unit 13. The line interval detection unit 12 includes a pixel distribution detection section 14, an auto-correlation processing section 15 and a first peak detection section 16. The line interval detection unit 12 obtains, from two-dimensional image data of a printed music, auto-correlation values in the direction of the vertical axis of distrubution data existing in the direction of the horizontal axis, detects a first peak of the auto-correlation values and provides it as the line interval. The line position detection unit 13 includes a five points addition section 17, a shift control section 18, a filter section 19, a peak point detection section 20 and a position detection section 21. The line position detection unit 13 adds data of five points which are spaced from each other by the line interval in the direction of the vertical axis of the distribution data of the pixel number obtained in the direction of the vertical axis, shifts these data of the five points successively in the vertical direction and thereby detects positions of staffs on the basis of the positions of the five points.

Figure 2:
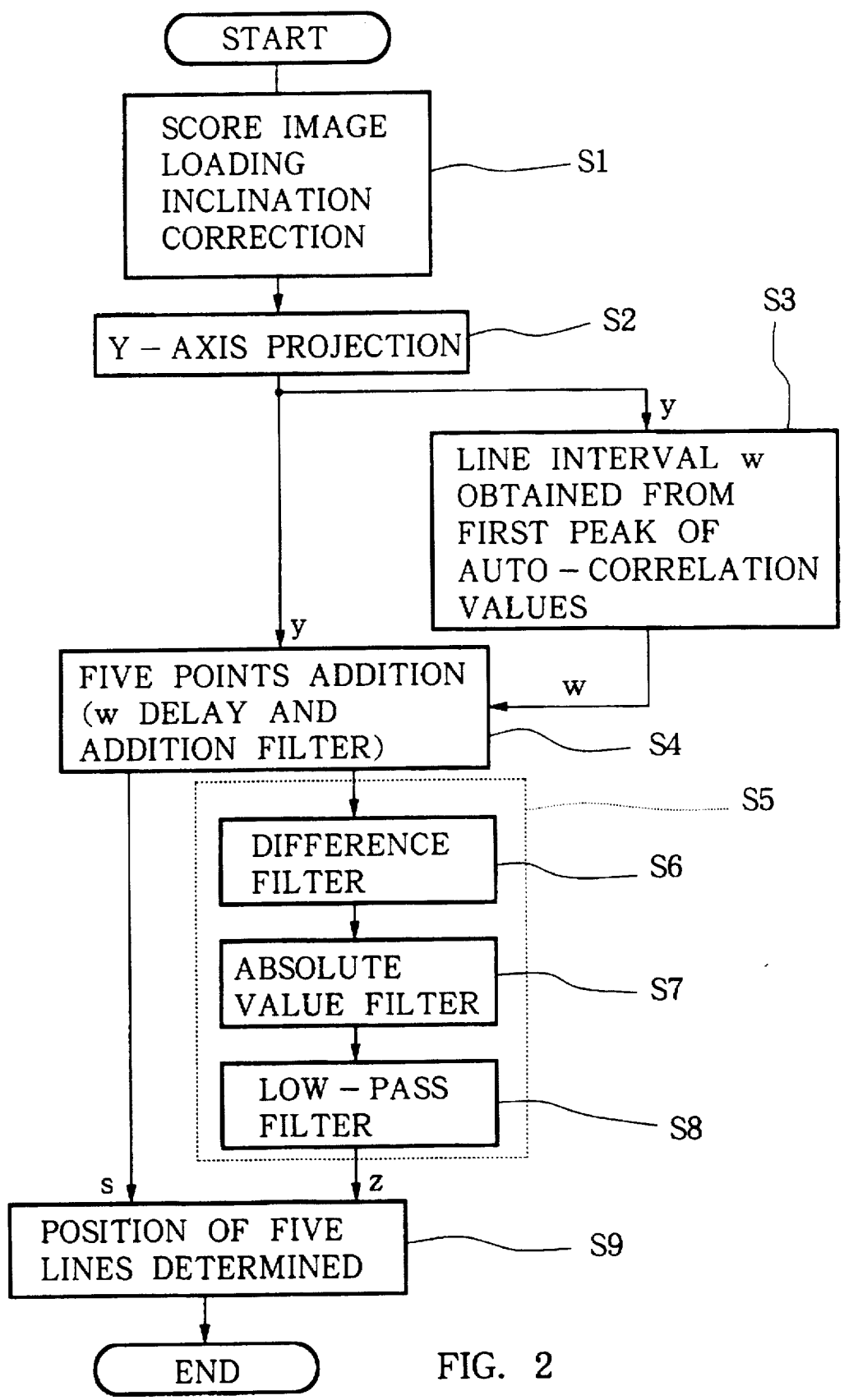
FIG. 2 is a flow chart for describing the operation of the embodiment of FIG. 1.

Referring now to the flow chart of FIG. 2, a specific operation of this embodiment will be described.

Step S1

Figure 3:
FIG. 3 is an illustration of an example of a printed music for describing the operation of the embodiment of FIG. 1.

Two-dimensional image data of a printed music as shown in FIG. 3 obtained from the printed music by means of an image scanner or the like means is stored in the image memory 11. In this case, the image data of the printed music stored in the image memory 11 is corrected in its inclination, if any, by a proper means.

Step S2

Figure 4:
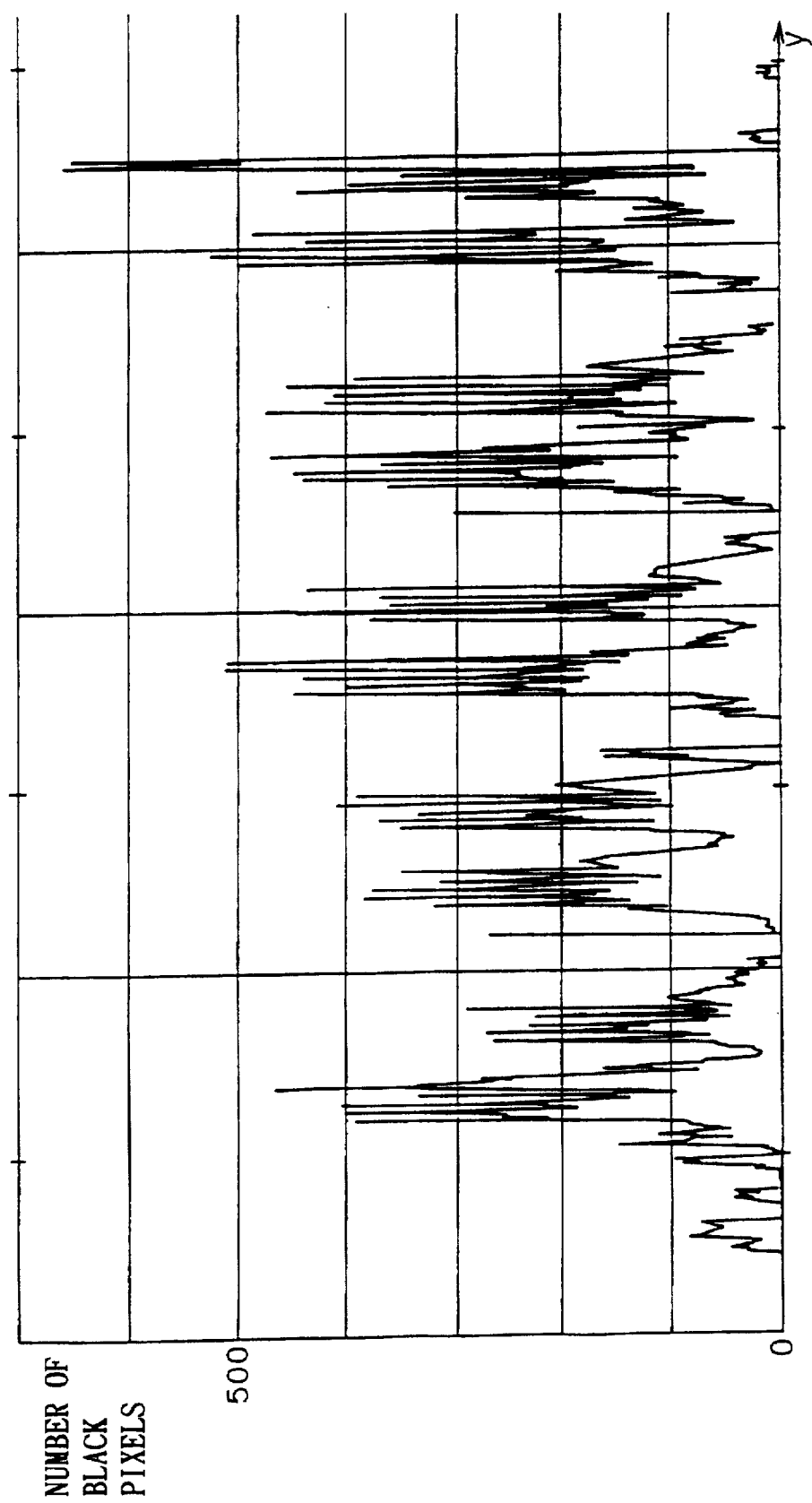
FIG. 4 is a diagram showing a histogram of y-axis projection for describing the operation of the embodiment of FIG. 1.

The pixel distribution detection section 14 projects the number of pixels in the direction of the x-axis in the two-dimensional image data of the printed music stored in the image memory 11 onto the y-axis and thereby detects pixel distribution data with respect to the y-axis. The y-axis projection of the image data of the printed music shown in FIG. 3 is as shown in FIG. 4.

The image data of the printed music is expressed by two-dimensional array having, as its element, $p(i,j)$ expressed in the following equation (1):

$$p(i,j)=0 \text{ (white)}, 1 \text{ (black)} \quad (\text{where } 0 \le i \le x, 0 \le i \le Y) \tag{1}$$

The y-axis projection $y(t)$ ($0 \le t \le Y$) of this image data of the printed music is expressed by the following equation (2):

$$y(t) = \sum_{X=0}^{X} p(x,t) \tag{2}$$

In the equation (2), $y(t)$ represents the sum of the black pixels arranged in the x-axis direction at a point t in the y coordinate.

Step 3

Figure 5:
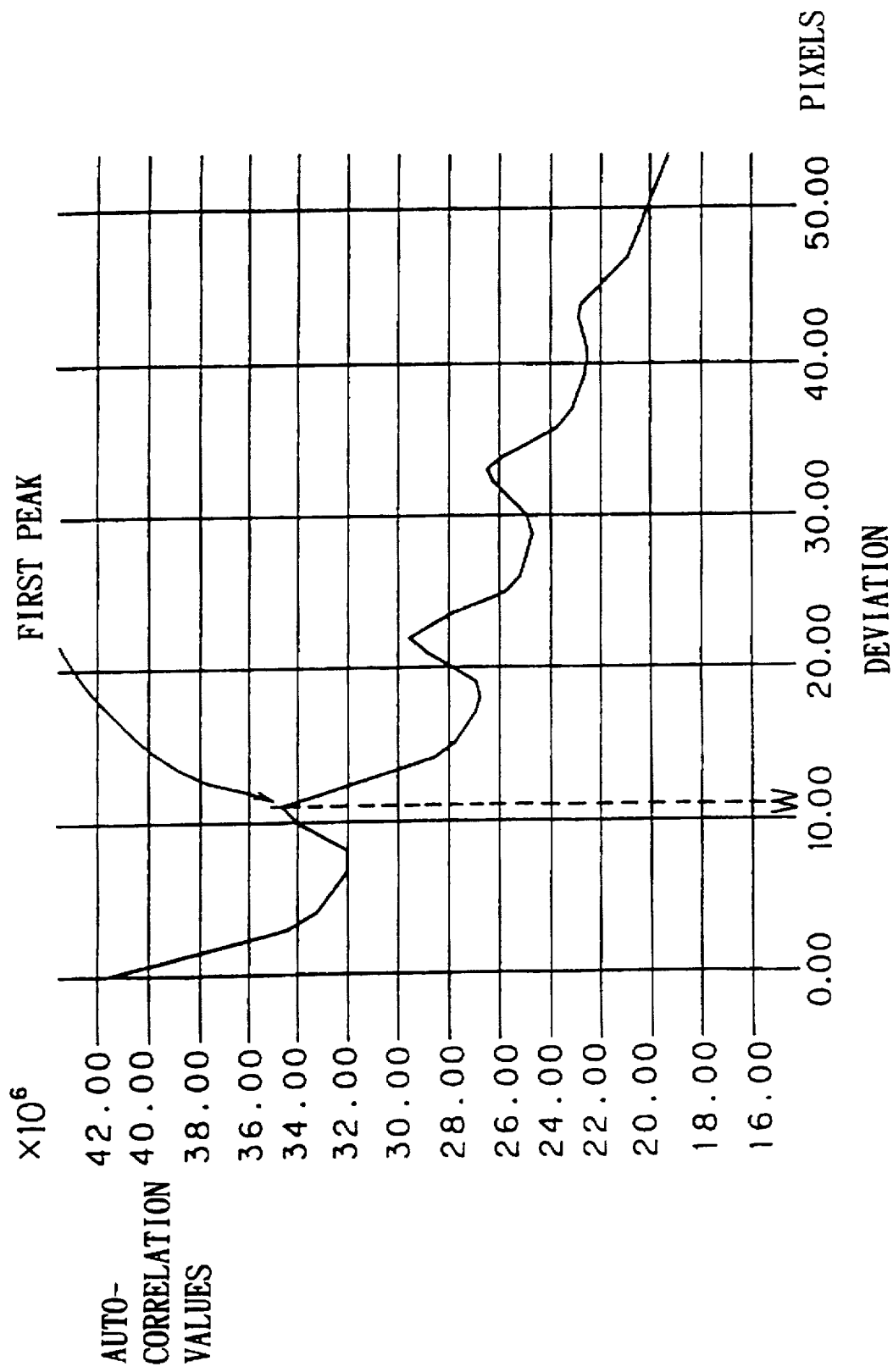
FIG. 5 is a diagram showing auto-correlation characteristics of the y-axis projection for describing the operation of the embodiment of FIG. 1.
Figure 6:
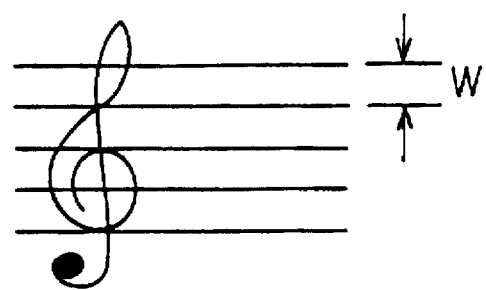
FIG. 6 is a view for describing the operation of the embodiment of FIG. 1.

The auto-correlation processing section 15 obtains auto-correlation values of the pixel distribution data in the direction of the y-axis. Data of auto-correlation values of the pixel distribution data of FIG. 4 is shown in FIG. 5. The first peak detection section 16 detects the first peak of the auto-correlation values and provides the deviation value in the y-axis which assumes this first peak as the line interval w (see FIG. 6).

More specifically, as a first step, auto-correlation values of the y-axis projection $y(t)$ obtained by the pixel distribution detection section 14 in step S2 are obtained.

Auto-correlation value a (τ) of the y-axis projection y(t) is expressed by the following equation (3):

$$a(\tau) = \sum_{t=0}^{y} y(t)y(t-\tau) \quad (3)$$

The value of τ at the time when the auto-correlation value a (τ) assumes the first peak is assumed to be the line interval w. Thus, detection of the line interval w by the line interval detection unit 12 is performed.

Step S4

The five points addition section 17 adds the y-axis projection y(t) obtained by the pixel distribution detection section 14 at five points spaced from each other by the line interval w provided by the first peak detection section 16. The shift control section 18 successively shifts positions of five points added by the five points addition section 17 in the direction of the y-axis.

Figure 7:
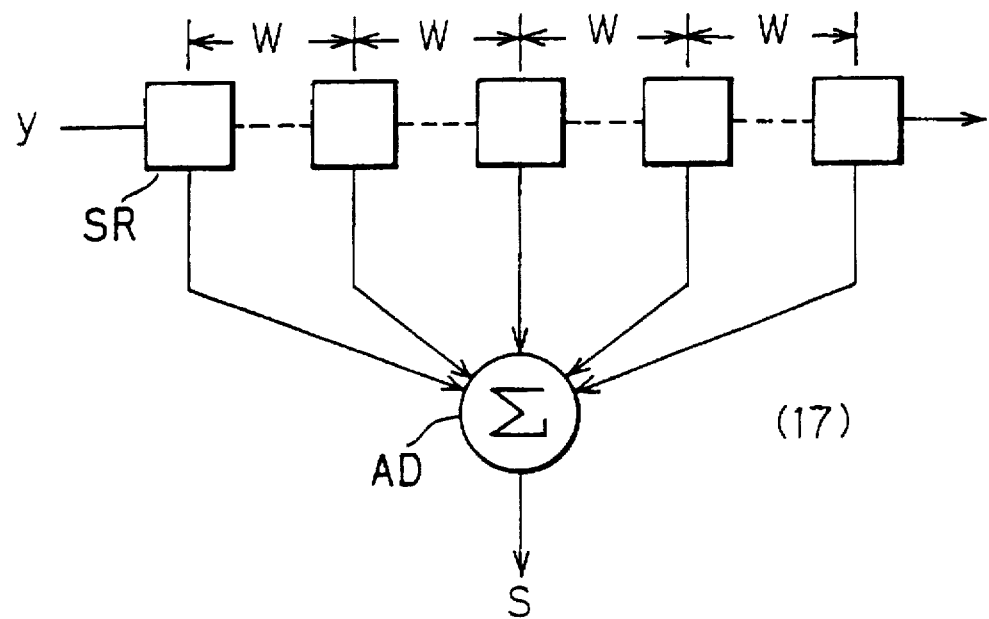
FIG. 7 is a block diagram schematically showing a structure of a delay and addition filter for describing the operation of the embodiment of FIG. 1.

The five points addition section 17 can be constructed of a delay and addition filter as shown in FIG. 7. The delay and addition filter is constructed of a shift register SR which sequentially shifts the y-axis projection data y(t) and has data output points at five points spaced from each other by the line interval w and an adder AD. In this case, the shift control section 18 controls a shift clock for controlling data shifting in the shift register SR.

The y-axis projection y(t) is applied to the delay and addition filter adding data of five points which are respectively delayed by the line interval w as shown in FIG. 7. Sum s(t) of the five points obtained by the adder AD is expressed by the following equation (4):

$$s(t) = \sum_{k=0}^{4} y(t - kw) \quad (4)$$

Thus, addition of data at the five points which are respectively delayed by w is successively shifted in the direction of the y-axis and, when the five points which are delayed by w correspond exactly to staffs, the y-axis projection data of staffs are all added together, so that the result of the addition is necessarily the largest value.

Figure 8:
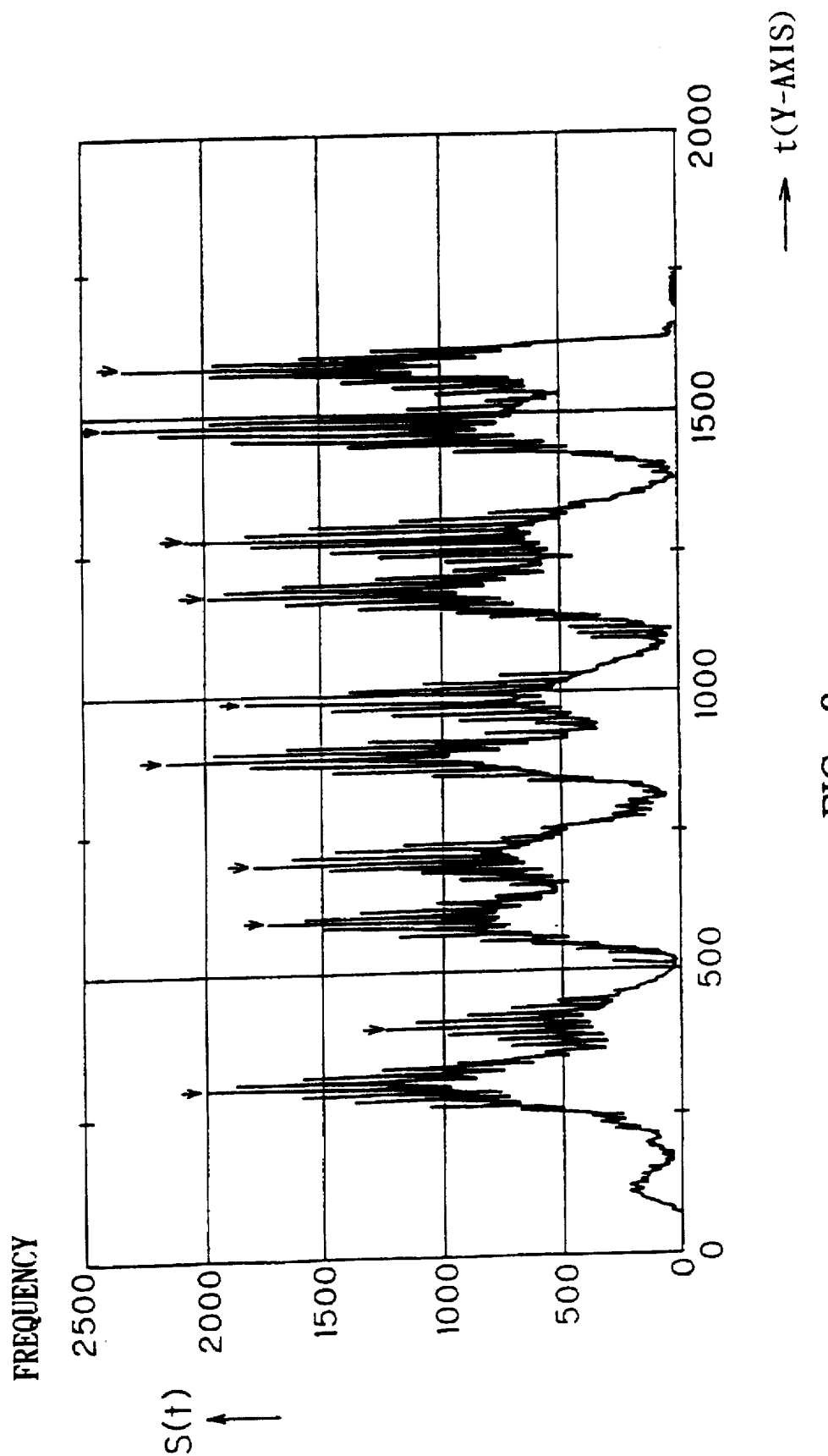
FIG. 8 is a diagram showing five points sum characteristics for describing the operation of the embodiment of FIG. 1.

The five points sum data of the pixel distribution data of FIG. 4 obtained in this manner is as shown in FIG. 8. In FIG. 8, points indicated by arrows correspond to the positions of staffs.

Step S5

The filter section 19 performs various filtering processing for facilitating detection of respective points corresponding to the positions of five lines indicated by the arrows in FIG. 8.

The filter section 19 is constructed, for example, of a difference filter, an absolute value filter and a low-pass filter. As the low-pass filter, a moving average filter, for example, may be used. The output s(t) of the five points addition section 17 is applied to the difference filter and the output of the difference filter is applied to the absolute value filter. The output of the absolute value filter in turn is applied to the moving average filter. Processings in these filters are respectively designated by steps S6, S7 and S8.

Step S6

Expressing an input by q(t) and an output by r(t), an output r(t) of the difference filter is expressed by the following equation (5):

$$r(t) = q(t) - q(t-1) \quad (5)$$

Step S7

Expressing an input by x(t) and an output by y(t), an output y(t) of the absolute value filter is expressed by the following equation (6):

$$y(t) = |x(t)| \quad (6)$$

Step S8

Expressing an input by q(t) and an output by y(t), an output y(t) of the moving average filter which constitutes the low-pass filter is expressed by the following equation (7):

$$y(t) = \sum_{\tau=0}^{4w-1} x(t-\tau) \quad (7)$$

An output z(t) which is finally obtained by the moving average filter on the basis of the output s(t) of the five points addition section 17 is expressed by the following equation (8):

$$\therefore z(t) = \sum_{t=0}^{4w-1} s(t-\tau) - s(t-\tau-1) \quad (8)$$

Figure 9:
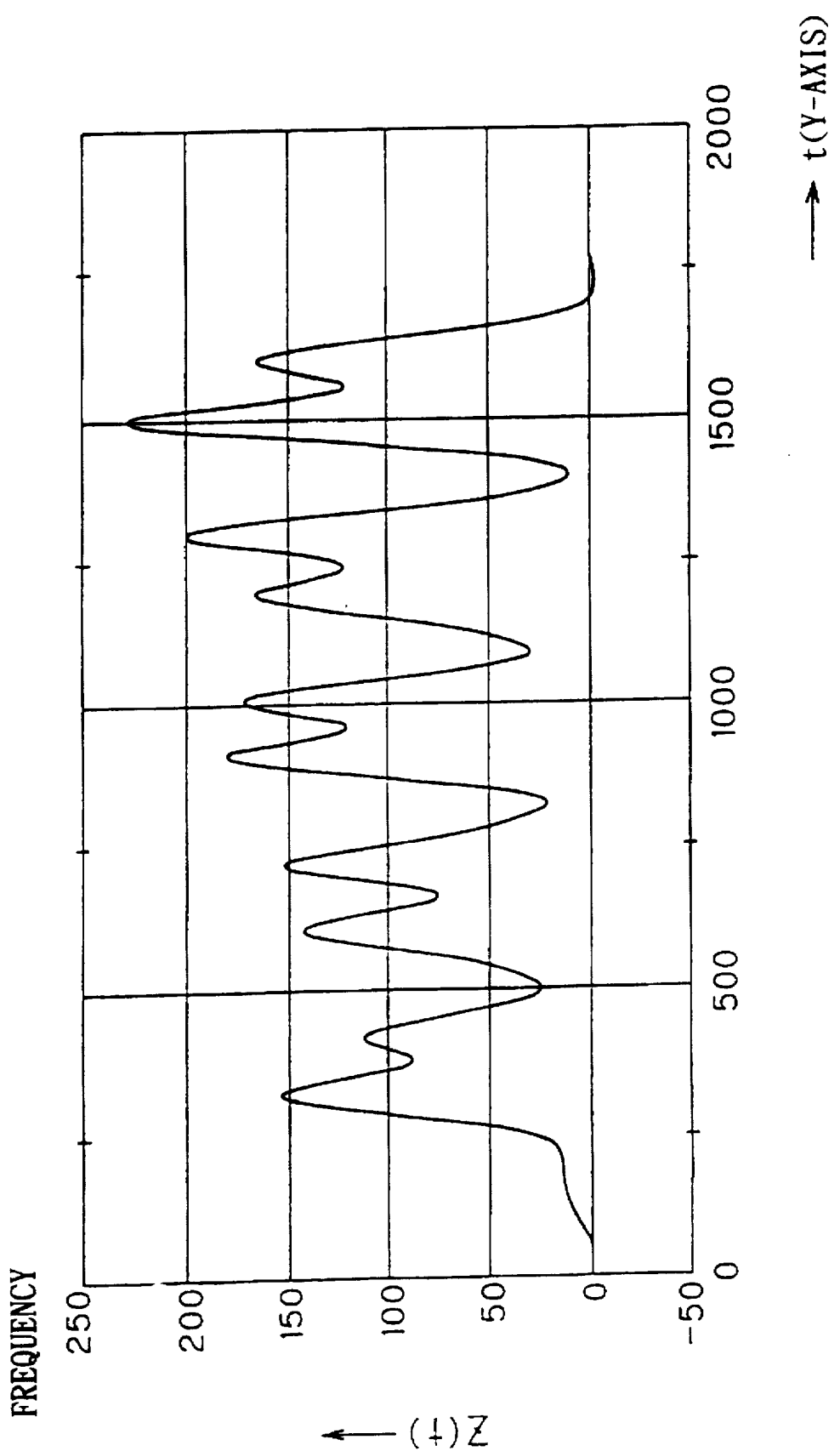
FIG. 9 is a diagram showing the result of processing by a moving average filter for describing the operation of the embodiment of FIG. 1.

The output z(t) of the moving average filter obtained for the five points sum data of FIG. 8 becomes as shown in FIG. 9.

Step S9

The peak point detection section 20 detects the final output of the filter section 19, i.e., a peak point of the moving average filter output z(t). The position detection section 21 operates in association with the shift control section 18 and detects positions of staffs on the basis of the peak point detected by the peak point detection section 20.

More specifically, in the vicinity of the value t at which the moving average filter output z(t) which is the final output of the filter section 19 assumes the peak value, the peak point detection section 20 detects the value of t at which the five points sum s(t) becomes a maximum value and provides it as a reference position of five lines (e.g., the y-coordinate of the fifth line).

In this manner, y-coordinates from the first line to the fifth line can be calculated on the basis of the reference position of staffs and the line interval w which has already been obtained and positions of five lines can thereby be detected.

The detected positions of staffs are used for successively removing five line data from the image data of the printed music and used also for identifying scale in subsequent recognition of notes.

Figure 10:
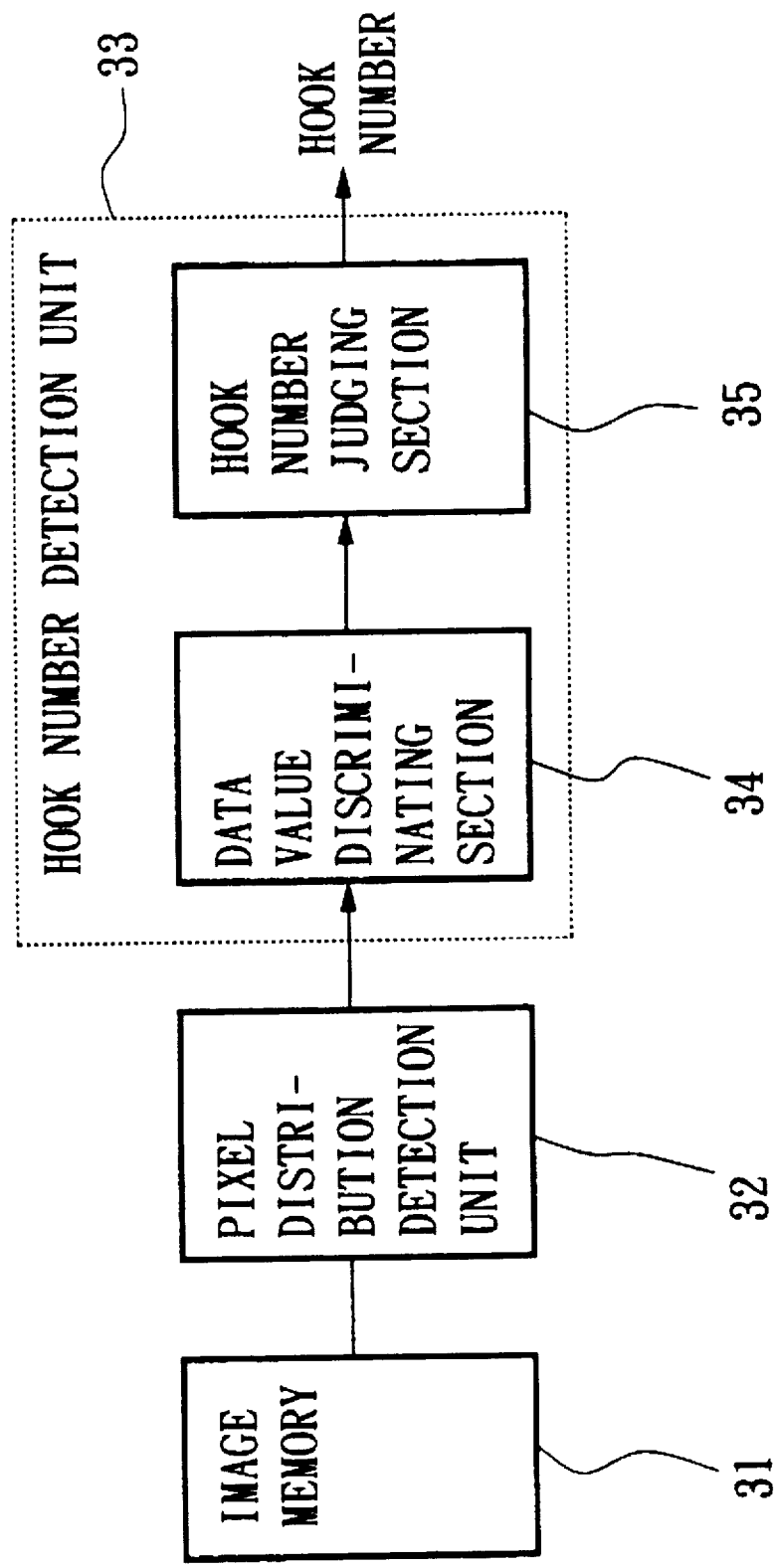
FIG. 10 is a block diagram schematically showing a structure of a main portion of an embodiment of the second automated recognition device for printed music according to the invention.

FIG. 10 schematically shows a main portion of an embodiment of the second automatic printed music recognition device according to the invention. FIG. 10 shows a structure for detecting the number of hooks of a note whose stem and head have already been recognized in the image of the printed music. For recognizing length of a tone represented by a note whose stem and head have already been recognized, the number of hooks is detected in this embodiment.

In this embodiment, a histogram of black pixels in a rectangular region having a predetermined width (e.g., the interval ×0.5) on both sides of the stem of a note whose head and stem have already been recognized is obtained along the y-axis. The pattern of this histogram is analyzed to detect the number of substantial peaks and the number of hooks is assumed on the basis of the number of peaks.

FIG. 10 shows an image memory 31, a pixel distribution detection unit 32 and a hook number detection unit 33. The image memory 31 stores image data of a printed music in which staffs and bar lines have already been removed from two-dimensional image data of the printed music and positions of heads and stems of notes in the printed music have already been recognized. The pixel distribution detection unit 32 determines a rectangular region having a predetermined width on both sides of a stem of a note on the basis of the positions of the head and stem which have already been recognized and detects distribution data along the vertical axis of the pixel number existing in the direction of the horizontal axis of the rectangular region. The hook number detection unit 33 includes a data value discriminating section 34 and a hook number judging section 35 and detects the number of hooks on the basis of length in the direction of the vertical axis consecutively exceeding a predetermined value in the distribution data.

The operation of the embodiment of the second automatic printed music recognition device will be described below.

Figure 11:
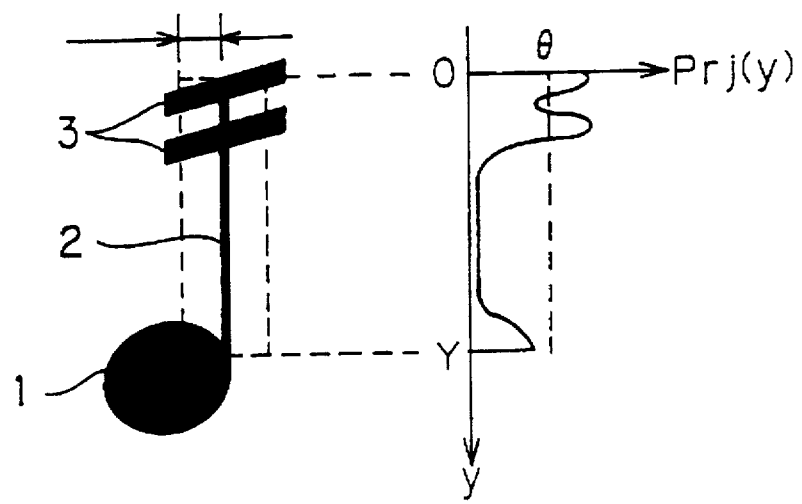
FIG. 11 is a block diagram schematically showing a part of a note and its y-axis projection data for describing the operation of the embodiment of FIG. 10.

The image distribution detection unit 32 obtains, with respect to a note whose head and stem have already been recognized, a histogram showing distribution with respect to the y-axis of the number of black pixels existing in a rectangular region having a predetermined width (e.g., the line interval×0.5) on both sides of the stem as shown in FIG. 11.

The hook number detection unit 33 assumes the number of hooks on the basis of the distribution pattern obtained by the image distribution detection unit 32.

The data value discrimination section in the hook number detection unit 33 traces the histogram prj in the following steps:

[1] Initializing of three variables status=0 len=0 n=0 where "status" is a variable representing status of the histogram prj (at a low level when it is 0 and at a high level when it is 1), len represents length of the high level in the direction of the x-axis when the histogram prj maintains a high level exceeding a predetermined value, and n represents the number of hooks.

Designating the variable of y-axis scanning by i, the following processing is repeated with respect to i=0 to Y;

if status=1 if prj(i)>θ then len=len+1 else (assume the number of hooks from len and add to n), status=0, len=0 else if prj(i)>θ then status=1, len=len+1

In this case, the predetermined value θ is of a magnitude at which the peak of the hooks can be detected, for example, a value corresponding to (the line interval×0.3).

The hook number judging section 35 assumes the number of hooks on the basis of len. That is, on the assumption that w1=line interval×0.8 and w2=line interval×0.4 the hook number can be assumed by the following equation (9):

$$(len+w2)/w1 \tag{9}$$

Figure 12:
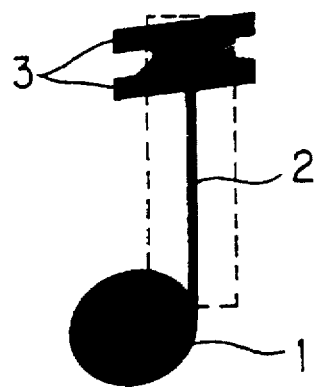
FIG. 12 is a diagram showing a part of an example of note image for describing the operation of the embodiment of FIG. 10.

The assumption of the number of hooks by the equation (9) is effective for avoiding counting 1 with respect to the number of hooks simply on the basis of the number of peaks in a note in which hooks have become continuous due to noise or other cause as shown in FIG. 12.

The above arrangement effectively enables detection of the number of hooks by treating hooks of a single note and hooks of grouped notes in the same manner.

Figure 13:
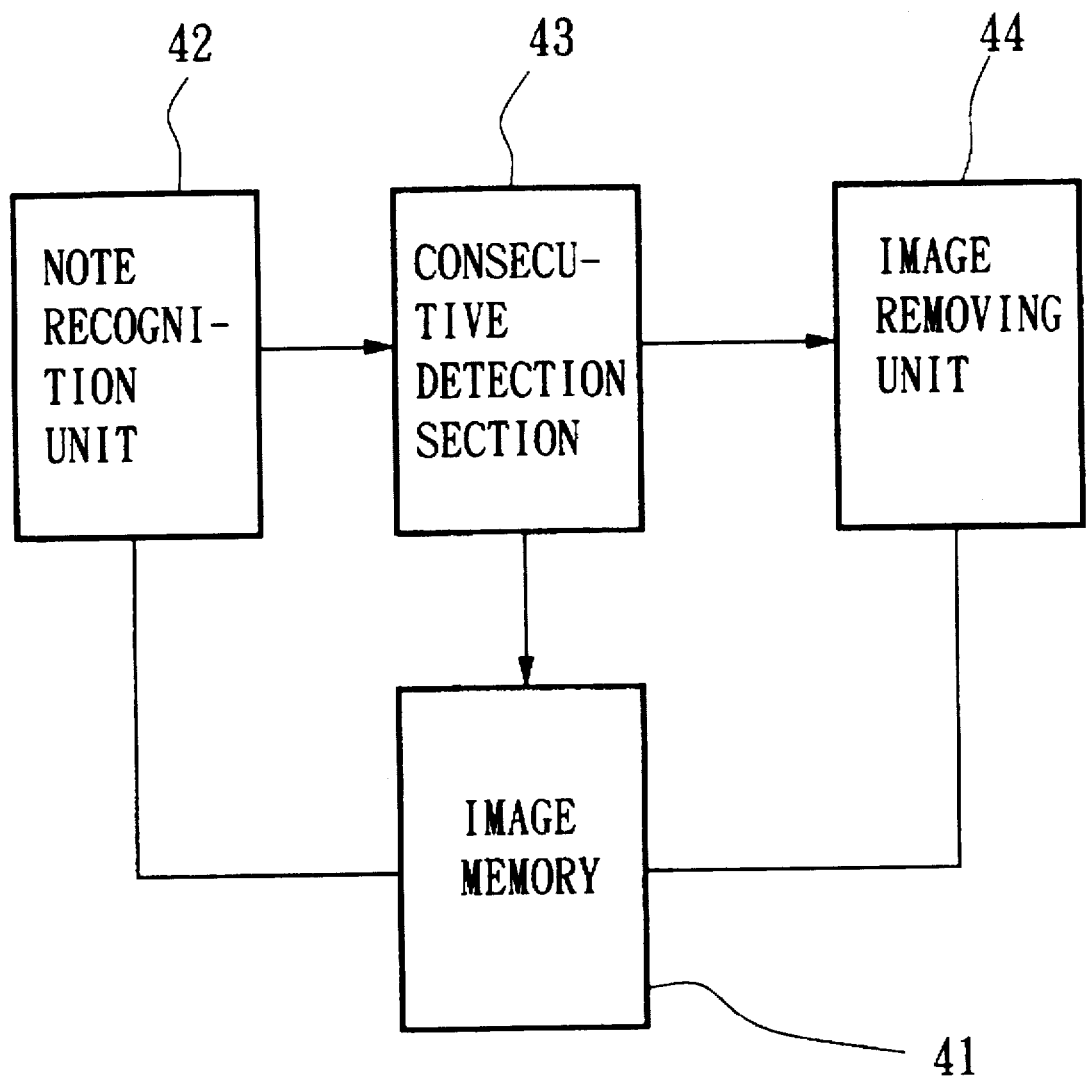
FIG. 13 is a block diagram schematically showing a structure of a main portion of an embodiment of the third automated recognition device for printed music according to the invention.

FIG. 13 schematically shows a structure of a main portion of an embodiment of the third automated printed music recognizing device according to the invention. The embodiment of FIG. 1 is a structure which, after notes have been detected and recognized from an image in which staffs and bar lines have already been removed, removes the notes which have been detected and recognized for reducing elements which may become an obstruction to recognition of signs which is to be conducted as a next step.

In this embodiment, the head and hook whose positions have alrady been known and points which are connected to them are removed at a high speed. In other words, a note is considered to be a stack made along the y-axis of line segments extending in the direction of the x-axis and these line segments are sequentially removed from an end point of the stem remote from the head toward the head. A line segment to be removed is one which is adjacent to a line segment which has been removed in an immediately preceding step.

FIG. 13 shows a main portion of the embodiment of the third automated printed music recognition device, i.e., an image memory 41, a note recognition unit 42, a consecutive data detection unit 43 and an image removing unit 44. The note recognition unit 42 recognizes notes from the image data of the printed music from which five lines and bar lines have already been removed. The consecutive data detection unit 43 obtains, on the basis of a range of removal in data of a predetermined scanning axis in note image data which is image data to be removed, consecutive data in data existing in the next scanning axis which at least partially coincides in coordinates thereof with the range of removal in the data of the predetermined scanning axis. The image removing unit 44 successively removes consecutive data obtained by the consecutive data detection unit 43 from the image data of the printed music in the image memory 41.

The operation of this embodiment will now be described.

For ensuring accurate detection and recognition of signs, detection and recognition of positions of notes must be made before detection of signs and note image data must be removed from the image data of the printed music before detection of signs.

Figure 14:
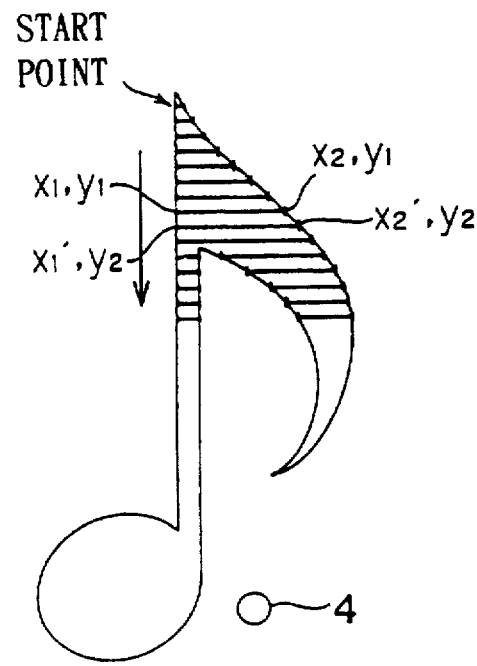
FIG. 14 is a diagram schematically showing a part of an example of note image for describing the operation of the embodiment of FIG. 13.

For removing a head and hook whose positions have already been known and points connected thereto at a high speed, the following processing is performed:

As shown in FIG. 14 which schematically illustrates a dotted eighth note, a note is considered to be a stack made in the direction of the y-axis of line segments extending in the direction of the x-axis and these line segments are sequentially removed. Removal is started from an end point of the stem remote from the head and proceeds toward the head.

A line segment to be removed is one which is adjacent to a line segment which has been removed in an immediately preceding step. The consecutive data detection unit 43 successively detects this line segment.

In this case, a line segment (x1', y2)–(x2', y2) (where $x1' \leq x2'$) which is adjacent to a line segment (x1, y1)–(x2, y1) (where $x1 \leq x2$) is a line segment satisfying the following conditions:

$$x1' \leq x2+1$$
$$x2' \geq x1-1 \tag{10}$$

Consecutive data consisting of line segments which satisfy this condition corresponds to the note image data to be removed. The image removing unit 44 successively removes this consecutive data from the image data of the printed music in the image memory 41.

This embodiment can be applied in the same manner to removal of signs which will be described below.

Figure 15:
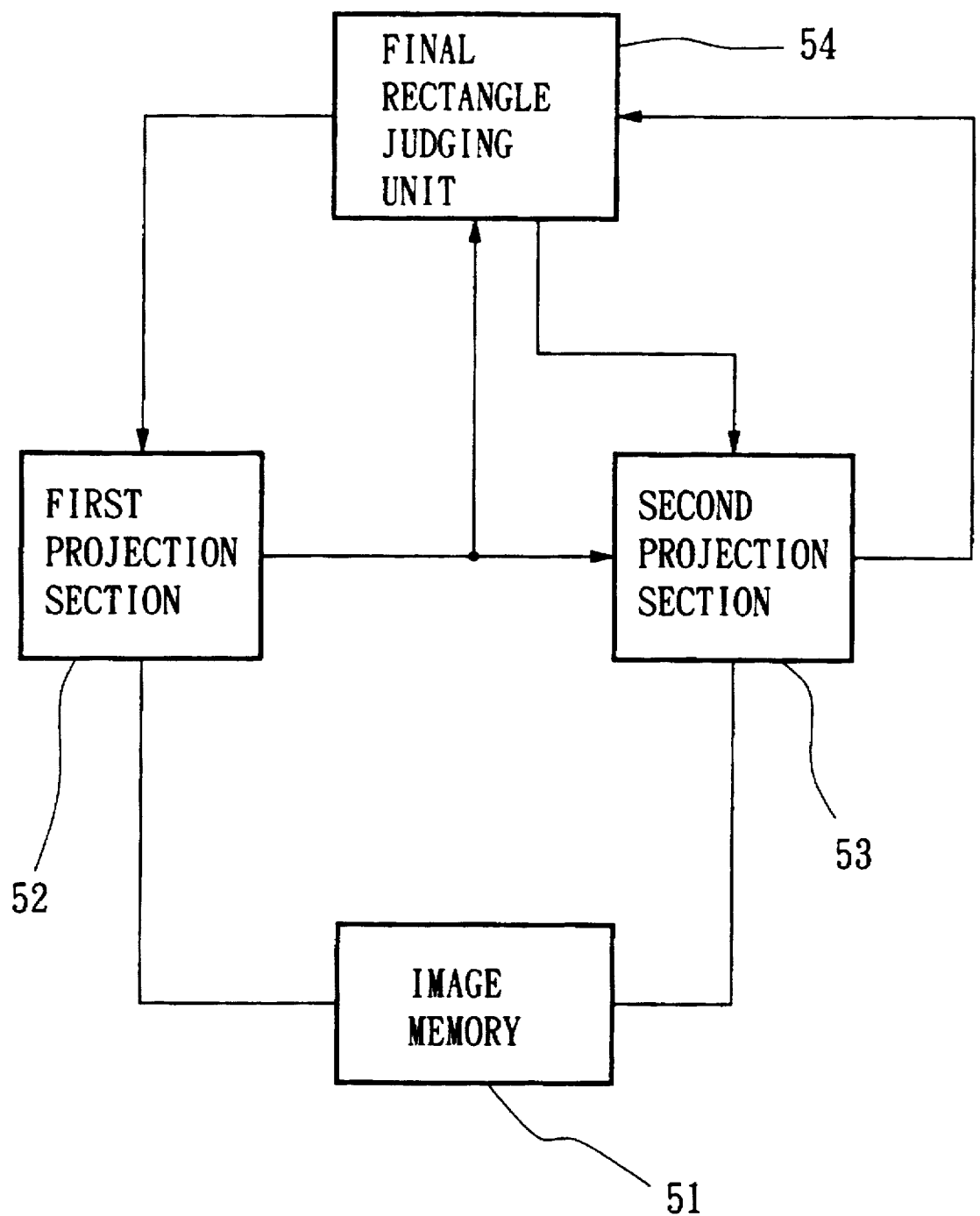
FIG. 15 is a block diagram schematically showing a structure of a main portion of an embodiment of the fourth automated recognition device for printed music according to the invention.

FIG. 15 schematically shows a structure of a main portion of an embodiment of the fourth automated printed music recognition device. FIG. 15 shows a structure for detecting accurate positions of signs for detecting signs from an image from which staffs, bar lines and notes have already been removed.

This embodiment detects a position of a rectangle enclosing a shape of a sign. The rectangle enclosing a shape of a sign is one having a diagonal consisting of a line segment having the minimum x and y coordinates of the shape of the sign at one end and the maximum x and y coordinates of the shape of the sign at the other end. By obtaining information concerning projection of the shape on the x-axis and y-axis alternately and repeatedly, the position of the rectangle is detected.

FIG. 15 shows a main portion of an embodiment of the fourth automated printed music recognition device according to the invention which includes an image memory 51, a first projection section 52, a second projection section 53 and a final rectangle judging unit 54. The first projection section 52 obtains distribution information along the x-axis of the number of black pixels existing in the direction of the y-axis of a shape in a region corresponding to, e.g., the entirety of the image of the printed music or the y-axis projection information thereof and thereby obtains x-axis projection information of the shape. The second projection section 53 obtains distribution information along the y-axis of the number of black pixels existing in the direction of the x-axis of the shape in a region corresponding to the x-axis projection information and thereby obtains the y-axis projection information of the shape. When the x-axis projection information or y-axis projection information obtained by the first projection section 52 and the second projection section 53 is equal s to preceding x-axis projection information or y-axis projection information, the final rectangle judging unit 54 judges that a region of rectangle about the shape has been determined. Otherwise, the final rectangle judging unit 54 provides the x-axis projection information obtained by the first projection section 52 to the second projection section 53 and provides the y-axis projection information obtained by the second projection section 53 to the first projection section 52 and thus repeats detection of the y-axis projection information and the x-axis projection information.

The operation of this embodiment will now be described.

For accurately detecting the position of a rectangle enclosing a shape of a sign, i.e., a rectangle having a diagonal consisting of a line segment having the minimum x and y coordinates of the shape of the sign at one end and the maximum x and y coordinates of the shape of the sign at the other end, x-axis and y-axis projection information of the shape is alternately obtained. The x-axis and y-axis projections of the shape means respectively, distribution of the number of black pixels in the directions of the x-axis and y-axis obtained along the x-axis and y-axis.

Let us assume, for example, that shapes A, B and C are included in image data stored in the image memory 51. Detection of positions of rectangles enclosing these shapes A, B and C will now be considered.

(1) First, projection on the x-axis is made by the first projection section 52. As a result, two regions Rx1 and Rx2 are obtained on the x-axis and, accordingly, the shape A is separated from the shapes B and C.

(2) Projection on the y-axis is made by the second projection section 53 respectively in the regions Rx1 and Rx2. As a result, the region Ry1 is obtained on the y-axis from the region Rx1 and the regions Ry2 and Ry3 are obtained on the y-axis from the region Rx2 and, accordingly, the shape B is separated from the shape C.

Figure 16:
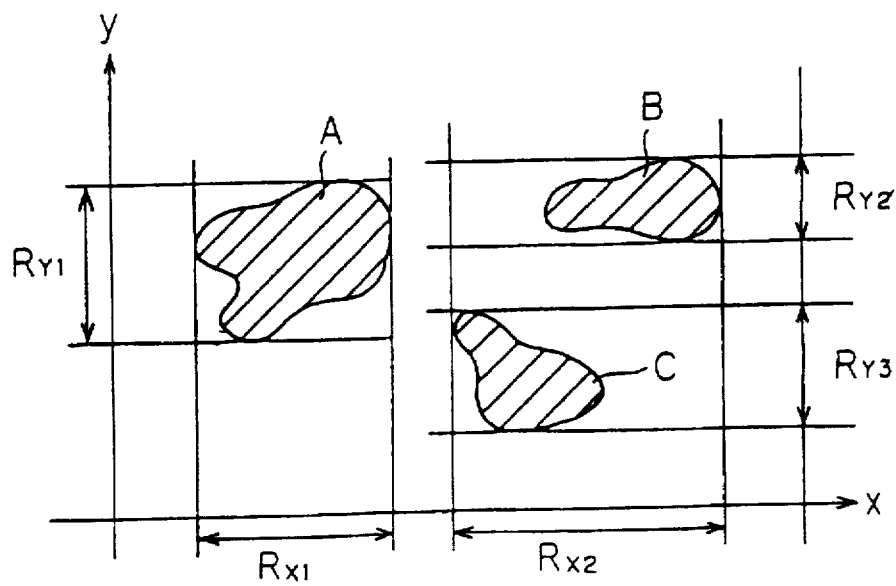
FIG. 16 is a diagram schematically showing an example of an image for describing the operation of the embodiment of FIG. 15.

(3) Likewise, projection on the x-axis is made in the regions Ry1, Ry2 and Ry3. The final rectangle judging unit 54 judges whether regions obtained by the x-axis projection are the same regions as those which have been obtained by the processing (1) above and, when they are the same, the projection is finished. In the case of FIG. 16, the processing is finished as to the shape A and the region for which projection on the x-axis is to be made is determined as to the shapes B and C.

(4) The same processing is repeated.

In using the above described algorithm, accurate detection of a shape at a position at which rectangles cross each other, i.e., at a position at which the x-axis projection and the y-axis projection overlap each other, cannot be expected.

Such crossing of rectangles, however, hardly occurs in shapes of signs in a printed music and no problem arises in this case. As to notes, however, there are special notes which are likely to cause a problem. They are, for example, a dot of a dotted eighth note etc., a dot of grouped notes and a rest. For recognizing such parts which are difficult to detect, notes are previously removed by the above described means. By removing notes in this manner, the parts which are difficult to detect can be detected.

Figure 17:
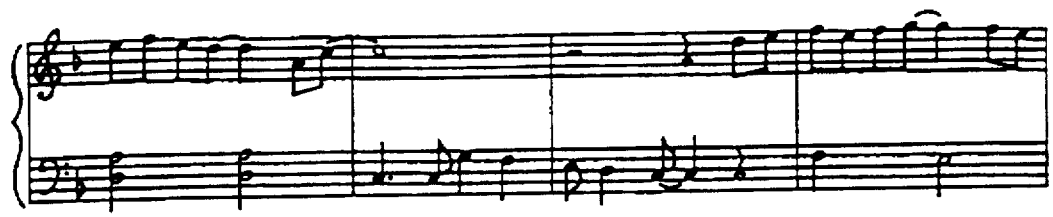
FIG. 17 is a diagram showing an example of an image of a printed music for describing the operation of the automated recognition device for printed music according to the invention.
Figure 18:
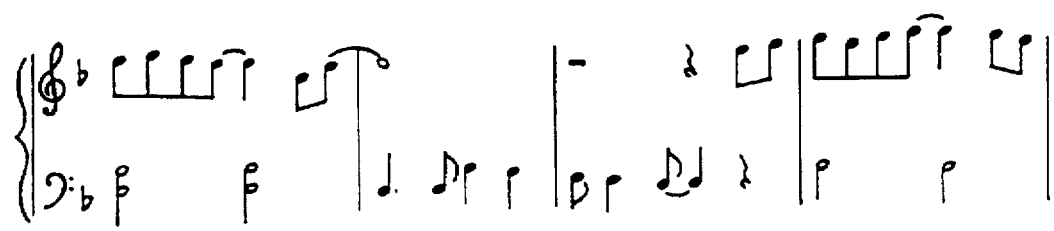
FIG. 18 is a diagram showing the image of the printed music shown in FIG. 17 from which staffs and bar lines have been removed for describing the operation of the device.
Figure 19:
FIG. 19 is a diagram showing the image of the printed music shown in FIG. 18 from which notes have been removed.
Figure 20:
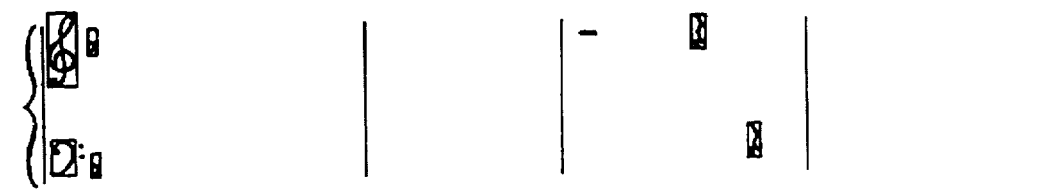
FIG. 20 is a diagram showing the image of the printed music shown in FIG. 19 from which signs have been removed.
Figure 21:
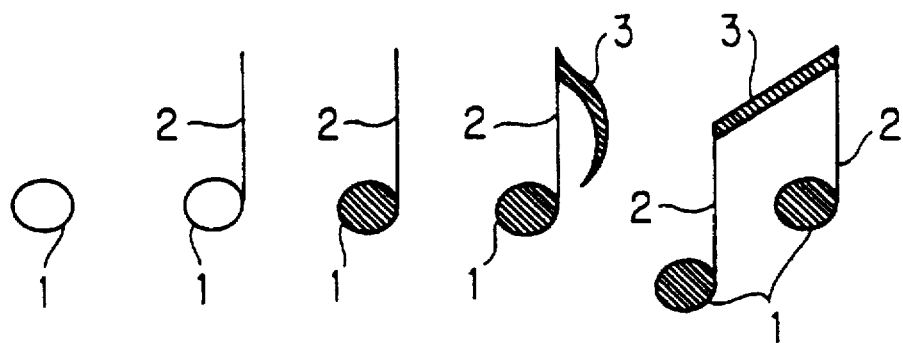
FIG. 21 is a diagram for showing the names of respective parts of a note.
Figure 22:
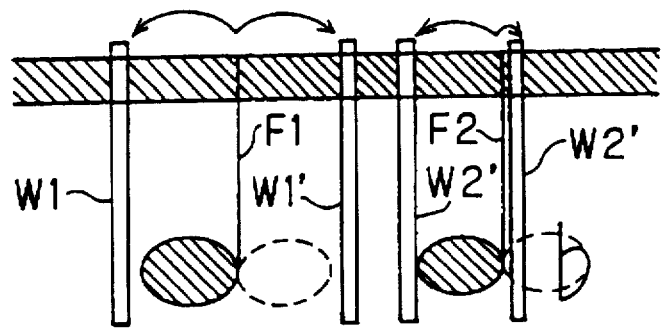
FIG. 22 is a diagram for describing an example of a prior art automatic printed music recognition processing.
Figure 23:
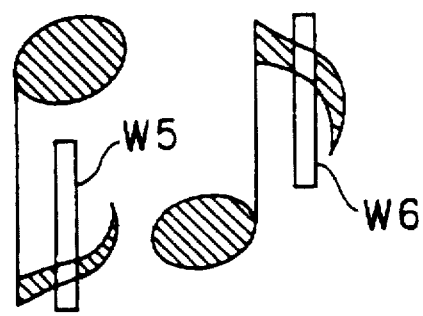
FIG. 23 is a diagram for describing another example of a prior art automatic printed music recognition processing.

By the above described processings, staffs and bar lines are detected and removed from image data of a printed music such as one shown in FIG. 17 to leave an image shown in FIG. 18. From this image, notes (heads and hooks etc.) are detected and removed to leave an image shown in FIG. 20. Remaining signs are recognized in the image of FIG. 20. According to the algorithm used in the invention, some data may be left unremoved after recognizing and removing image including staffs, bar lines and notes. In a case where such unremoved data has occurred, an adverse effect of such unremoved data to recognition of other signs will be prevented by not recognizing data of a size which is different from a size of rectangle for a shape of a sign which is previously registered, so that no serious problem will arise from executing the algorithm of the invention.

What is claimed is:

1. An automated recognition device for printed music comprising:
    converting means for converting information of the printed music to two-dimensional image data;
    line interval detection means for obtaining auto-correlation values in a direction of a vertical axis of distribution data of a number of pixels existing in a direction of a horizontal axis for each distribution data point along the vertical axis of the two dimensional image data and for detecting a first peak value of the obtained auto-correlation values as constituting a line interval of staffs of the printed music; and
    line position detection means responsive to the line interval detection means for detecting positions of the staffs by adding data at five different points which are spaced apart by the detected line interval between adjacent points in the direction of the vertical axis of the distribution data, the data representing the number of pixels obtained in the direction of the vertical axis for each of the five different points and successfully shifting the five points along the vertical axis to thereby detect positions of the five points at a time when a maximum sum of the data is obtained, wherein the staffs of the printed music are detected by defining the positions of the five points as the positions of the staffs when the maximum sum of the data is obtained.

2. An automated recognition device for printed music comprising:

converting means for converting information of the printed music to two-dimensional image data;

pixel distribution detection means for obtaining distribution data in a direction of a vertical axis of a number of pixels existing in a direction of a horizontal axis in a rectangular region having a predetermined width on both sides of a stem of a note; and hook number detection means for detecting at least one hook of the note on the basis of a length along the direction of the vertical axis of the distribution data corresponding to a number of times that the number of pixels along the horizontal axis consecutively exceed a predetermined value, the hook detection means being operative to detect the number of hooks by adding the length to a second predetermined value and by dividing this result by a third predetermined value, wherein recognition of the note is performed by employing the at least one detected hook.

3. An automated recognition device for printed music comprising:

conversion means for converting information of the printed music to two-dimensional image data;

first projection means for dividing out a region encompassing a sign in the direction of a first axis by projecting the image data with respect to the first axis;

second projection means for dividing out the region encompassing the sign in the direction of a second axis by projecting, with respect to the second axis, each image data output by said first projection means;

final projection judging means for comparing a result of a preceding dividing and a result of a current dividing by said first projection means or said second projection means and, when the compared results are equal to each other, determining the region encompassing the sign on the basis of the results of the division and, when the compared results are not equal to each other, causing a dividing operation by said first projection means or by said second projection means to be repeated; and recognition means for recognizing the sign existing in the region determined by said final projection judging means.

4. An automated recognition device for printed music comprising:

a converting circuit that converts information of the printed music to two-dimensional image data;

a line interval detection circuit that obtains auto-correlation values in a direction of a vertical axis of distribution data of a number of pixels existing in a direction of a horizontal axis for each distribution data point along the vertical axis of the two dimensional image data and that detects a first peak value of the obtained auto-correlation values as constituting a line interval of staffs of the printed music; and a line position detection circuit, responsive to the line interval detection circuit, that detects positions of the staffs by adding data at five different points which are spaced apart by the detected line interval between adjacent points in the direction of the vertical axis of the distribution data, the data representing the number of pixels obtained in the direction of the vertical axis for each of the five different points and successfully shifting the five points along the vertical axis to thereby detect positions of the five points at a time when a maximum sum of the data is obtained, wherein the staffs of the printed music are detected by defining the positions of the five points as the positions of the staffs when the maximum sum of the data is obtained.

5. An automated recognition device for printed music comprising:

a converting circuit that converts information of the printed music to two-dimensional image data;

a pixel distribution detection circuit that obtains distribution data in a direction of a vertical axis of a number of pixels existing in a direction of a horizontal axis in a rectangular region having a predetermined width on both sides of a stem of a note; and a hook number detection circuit that detects at least one hook of the note on the basis of a length along the direction of the vertical axis of the distribution data corresponding to a number of times that the number of pixels along the horizontal axis consecutively exceed a predetermined value, the hook detection circuit being operative to detect the number of hooks by adding the length to a second predetermined value and by dividing this result by a third predetermined value, wherein recognition of the note is performed by employing the at least one detected hook.

6. An automated recognition device for printed music comprising:

a conversion circuit that converts information of the printed music to two-dimensional image data;

a first projection circuit that divides out a region encompassing a sign in the direction of a first axis by projecting the image data with respect to the first axis;

a second projection circuit that divides out the region encompassing the sign in the direction of a second axis by projecting, with respect to the second axis, each image data output by said first projection circuit;

a final projection judging circuit that compares a result of a preceding dividing and a result of a current dividing by said first projection circuit or the second projection circuit and, when the compared results are equal to each other, determining the region encompassing the sign on the basis of the results of the division and, when the compared results are not equal to each other, causing a dividing operation by said first projection circuit or by the second projection circuit to be repeated; and a recognition circuit that recognizes the sign existing in the region determined by said final projection judging circuit.

7. A method of automated recognition of printed music, the method comprising the steps of:

converting information of the printed music to two-dimensional image data;

obtaining auto-correlation values in a direction of a vertical axis of distribution data of a number of pixels existing in a direction of a horizontal axis for each distribution data point along the vertical axis of the two dimensional image data;

detecting a first peak value of the obtained auto-correlation values as constituting a line interval of staffs of the printed music; and detecting positions of the staffs by adding data at five different points which are spaced apart by the detected line interval between adjacent points in the direction of the vertical axis of the distribution data, the data representing the number of pixels obtained in the direction of the vertical axis for each of the five different points and successfully shifting the five points along the vertical axis to thereby detect positions of the five points at a time when a maximum sum of the data is obtained, wherein the staffs of the printed music are detected by defining the positions of the five points as the positions of the staffs when the maximum sum of the data is obtained.

8. A method of automated recognition of printed music, the method comprising the steps of:

converting information of the printed music to two-dimensional image data;

obtaining distribution data in a direction of a vertical axis of a number of pixels existing in a direction of a horizontal axis in a rectangular region having a predetermined width on both sides of a stem of a note; and detecting at least one hook of the note on the basis of a length along the direction of the vertical axis of the distribution data corresponding to a number of times that the number of pixels along the horizontal axis consecutively exceed a predetermined value; and detecting the number of hooks by adding the length to a second predetermined value and by dividing this result by a third predetermined value, wherein recognition of the note is performed by employing the at least one detected hook.

* * * * *